(12) United States Patent
Ferron et al.

(10) Patent No.: US 10,568,457 B2
(45) Date of Patent: Feb. 25, 2020

(54) CONTAINER FOR COOKING FOODS

(71) Applicant: BALLARINI PAOLO & FIGLI S.p.A., Rivarolo Mantovano (MN) (IT)

(72) Inventors: Francesco Ferron, Casalmaggiore (IT); Jacopo Ferron, Casalmaggiore (IT)

(73) Assignee: BALLARINI PAOLO & FIGLI S.P.A., Rivarolo Mantovano (MN) (IT)

( * ) Notice: Subject to any disclaimer, the term of this patent is extended or adjusted under 35 U.S.C. 154(b) by 212 days.

(21) Appl. No.: 15/331,084

(22) Filed: Oct. 21, 2016

(65) Prior Publication Data
US 2017/0112320 A1    Apr. 27, 2017

(30) Foreign Application Priority Data
Oct. 26, 2015    (IT) .................. 202015000065456

(51) Int. Cl.
*A47J 36/02* (2006.01)
*A47J 36/04* (2006.01)

(52) U.S. Cl.
CPC ............. *A47J 36/025* (2013.01); *A47J 36/02* (2013.01); *A47J 36/04* (2013.01)

(58) Field of Classification Search
CPC ........... A47J 36/025; A47J 36/04; A47J 36/02
USPC ..................................................... 220/573.2
See application file for complete search history.

(56) References Cited

U.S. PATENT DOCUMENTS

| | | | |
|---|---|---|---|
| 3,884,868 A * | 5/1975 | Trice ..................... | A47J 36/02 428/422 |
| 6,761,964 B2 * | 7/2004 | Tannenbaum ........ | A47J 36/025 428/213 |
| 7,858,188 B2 * | 12/2010 | Hayakawa ............... | A47J 36/02 428/408 |
| 8,158,251 B2 * | 4/2012 | Cardoso ................ | A47J 36/025 428/325 |
| 8,540,107 B2 * | 9/2013 | Lee ........................ | A47J 36/025 220/573.1 |
| 8,616,245 B2 * | 12/2013 | Albert .................... | B05D 5/083 138/141 |
| 8,895,133 B2 * | 11/2014 | Nesbitt ................. | A47J 36/025 428/143 |
| 9,402,510 B2 * | 8/2016 | Groll ..................... | A47J 36/025 |
| 2003/0169801 A1 * | 9/2003 | Chilton ................... | A47J 27/00 374/142 |
| 2006/0134104 A1 * | 6/2006 | Dennis ................. | C07K 16/005 424/133.1 |
| 2015/0104567 A1 * | 4/2015 | Lee ........................ | G06F 3/044 427/125 |
| 2017/0303737 A1 * | 10/2017 | Allemand ............. | A47J 36/025 |

FOREIGN PATENT DOCUMENTS

FR        3025995 A1 *    3/2016   ............ A47J 36/025

* cited by examiner

*Primary Examiner* — Anthony D Stashick
*Assistant Examiner* — James M Van Buskirk
(74) *Attorney, Agent, or Firm* — King & Schickli, PLLC

(57) ABSTRACT

The container for cooking food comprises a body (2) comprising a bottom wall (3) and at least one side wall (4) extending from the said bottom wall (3), at least one first non-stick coating (30) on at least part of the inside surface of the bottom wall (3), and at least one second non-stick coating (40) on at least part of the inside surface of the side wall (4); the first non-stick coating (30) differs from the second non-stick coating (40) and has greater resistance to scratching than the second non-stick coating (40).

14 Claims, 1 Drawing Sheet

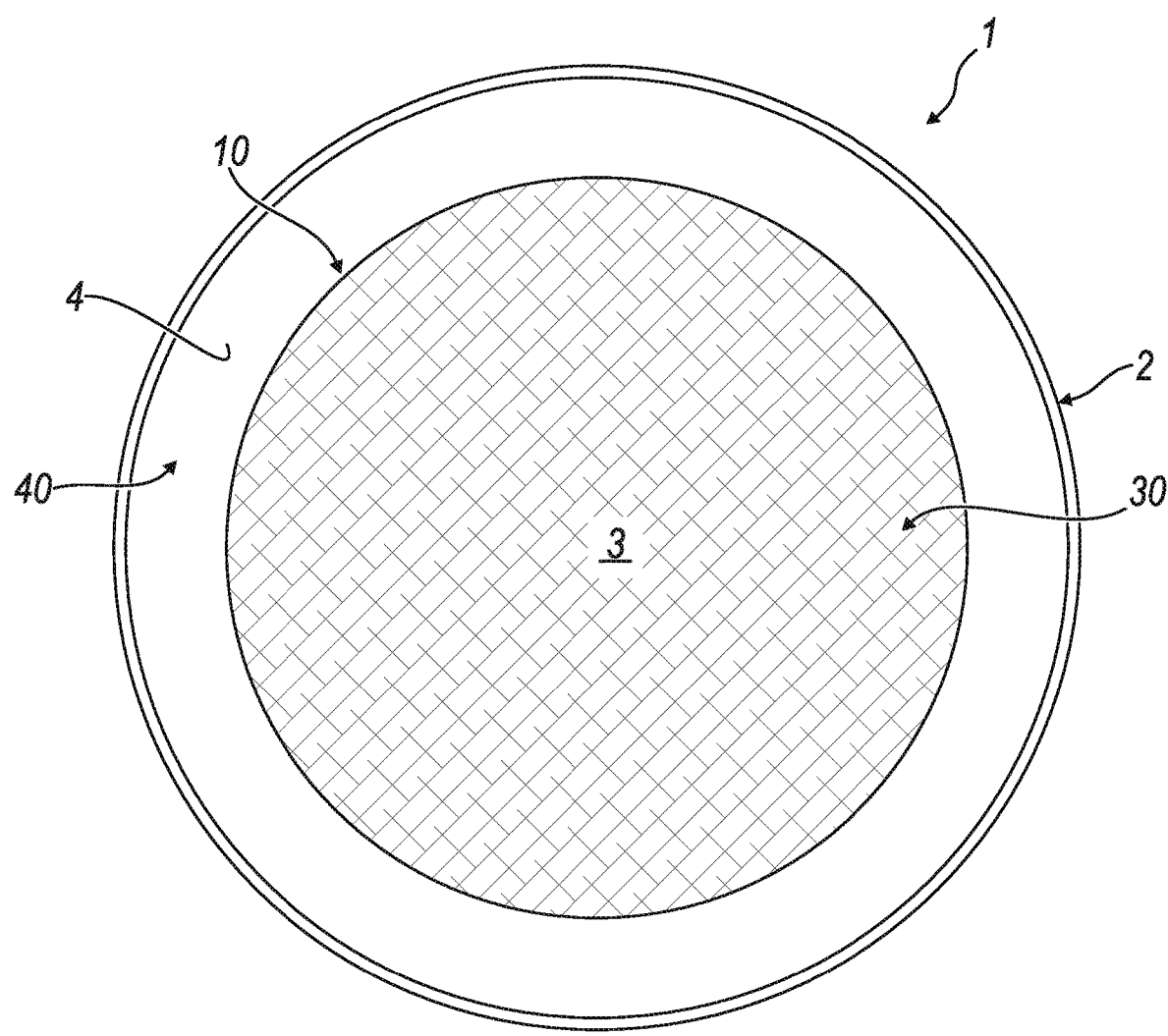

CONTAINER FOR COOKING FOODS

This invention relates to a container for cooking food according to the precharacterising part of the principal claim.

More particularly it relates to a metal container, of for example aluminium, for cooking food, provided with a body, the inside surfaces of which are provided with a non-stick coating.

BACKGROUND

It is known that the performance characteristic of a non-stick coating which has resulted in its commercial success is its ability not to cause the food to stick during cooking. This gives rise to appreciable benefits in food cooking quality, nutritional and operating safety, lightening the task of supervision, ease of maintenance and other advantages associated with these.

One criterion which is particularly used to evaluate the quality of non-stick coatings is their resistance to scraping, or scratching, caused for example by cooking utensils, in particular when hot while food is being cooked.

Obviously containers for cooking food, for example saucepans provided with non-stick coatings of poor quality, that is ones poorly resistant to scratching, and other containers provided with high quality non-stick coating, one highly resistant to scratching, are available commercially.

A first disadvantage of quality non-stick coatings is their high cost.

Another disadvantage of quality non-stick coatings lies in the fact that they cannot readily be identified by ordinary users. In fact apart from purchase price and printed advertising from manufacturers of these saucepans, there are no objective criteria which make it possible for those purchasing a non-stick saucepan to ensure that they are acquiring a saucepan provided with a quality non-stick coating. High cost does not always guarantee that a saucepan is provided with a high quality coating.

SUMMARY

The object of this invention is therefore to provide a container for cooking food which is provided with a quality non-stick coating which does not have an excessively high cost for the consumer.

Another object of the invention is to provide a container for cooking food which allows ordinary consumers to readily identify whether a high quality non-stick coating is present.

These and other objects will be accomplished through a container for cooking food produced in accordance with the technical teaching in the appended claims.

BRIEF DESCRIPTION OF THE DRAWINGS

Further characteristics and advantages of the invention will be apparent from the description of a preferred but non-exclusive embodiment of the container for cooking food, illustrated by way of example and therefore not limiting in any way, in the appended drawings, in which:

FIG. 1 is a plan view of a preferred embodiment of the container according to the invention.

DETAILED DESCRIPTION

With reference to said FIG. 1, this shows a container 1 for cooking food.

Container 1 comprises a body 2 comprising a bottom wall 3 and at least one side wall 4 extending from said bottom wall 3.

In the example in FIG. 1, container 1 is a conventional saucepan provided with a substantially circular bottom wall 3. The saucepan comprises a single side wall 4 extending from bottom wall 3, and more specifically from the circular edge of bottom wall 3.

It is however possible to envisage a container 1 provided with a plurality of side walls 4, for example a container in which bottom wall 3 is of quadrilateral shape.

Side wall 4 extends from bottom wall 3 in a conventional way that is already known, in such a way as to form an internal space 10 in the container, in which food is placed in order to be cooked.

Container 1 according to the invention comprises at least one first non-stick coating 30 applied to at least part of the inside surface of bottom wall 3, and at least one second non-stick coating 40 applied to at least part of the inside surface of side wall 4.

By inside surface is obviously meant the surface of bottom wall 3 or side wall 4 facing internal space 10 of container 1, that is the surface on which the food which has to be cooked is placed.

Preferably first non-stick coating 30 is applied to all the inside surface area of bottom wall 3, as may be seen in the figure.

In a likewise preferred manner second non-stick coating 40 is applied to all the inside surface area of side wall 4, regardless of the fact that first coating 30 has been applied to all the inside surface area of at least bottom wall 3.

In a particularly preferred embodiment of the invention first non-stick coating 30 is applied to all the inside surface area of bottom wall 3, and second non-stick coating 40 is applied to all the inside surface area of side wall 4.

According to this invention first non-stock coating 30 differs from second non-stick coating 40 and has a greater resistance to scratching than second non-stick coating 40.

This makes it possible to have a container 1 for cooking food which has a working surface area provided with a quality coating, without this however resulting in excessively high cost because the quality coating is applied to only the aforesaid working surface. In this case the working surface comprises at least part of the inside surface area of bottom wall 3, preferably all of the inside surface area of bottom wall 3.

In the context of the invention, by the resistance of a non-stick coating is meant its resistance to scratching caused for example by cooking utensils, in particular utensils having sharp blades, and especially when hot, that is while food is being cooked. The words "when hot" are to be understood to be temperatures over 50° C., preferably between 100° C. and 300° C.

In the context of the invention the resistance of non-stick coatings is measured by means of the "Mechanical Tiger Paw" test, also known as the MTP test. As is known to those skilled in the art this test comprises subjecting a cooking vessel held at a temperature of 200° C. to simulate the cooking of food to a scratching action by three metal points, for example of tungsten carbide, with a pressure exerted by weight of 0.4 kg. These points are caused to scrape the tested surface along a substantially epicycloidal path resulting from unconstrained circular movement of the points and simultaneous lateral movement of a heated plate on which the container under test is placed. The speed at which the points scrape the test surface varies substantially from 15 to 30 meters per minute depending upon their position with respect to the centre of rotation.

The equipment provides for 90 rotations of the metal points to be made per minute, while the plate performs a lateral movement cycle of approximately 4 cm every 2 seconds.

The result of the MTP resistance test is expressed numerically and is correlated with treatment time, the numerical values being expressed by a figure from 1 to a maximum of 10, the latter value corresponding to a new non-stick coating. For a worn coating the maximum quality level which can be achieved is therefore 9.

In the current state of the art a coating is defined as being highly scratch resistant when it has a resistance value of 9 after 3 hours treatment.

A coating is considered to be suitable for the use of metal utensils when it exceeds a resistance value of 5 in the MTP test after 3 hours treatment.

The value 5 is therefore the reference value for defining a utensil having a non-stick coating which is suitable for the use of metal utensils, and will constitute our evaluation point below, because it has the advantage of being identified with greater accuracy, being the moment at which scratching begins to reveal the presence of the underlying metal, for example aluminium.

It is pointed out that the MTP scratch resistance test is carried out on flat surfaces or surfaces very close to being flat, such as in particular the bottom of a cooking container, and cannot be performed on the walls of the container. Thus characterisation of the coating which has to be applied to the wall is achieved by subjecting the test described to one or more bottoms of cooking vessels to which the coating has been applied.

According to a preferred aspect of the invention, first non-stick coating 30 has a scratch resistance value of 5 or more in the MTP test, after a treatment time of more than 12 hours.

Preferably first non-stick coating 30 has a resistance value of 5 after a treatment time of over 24 hours.

Even more preferably, first non-stick coating 30 has a scratch resistance value of 5 after a treatment time of over 36 hours.

In accordance with a preferred embodiment of the invention second non-stick coating 40 (more economical) has a minimum resistance value of 5 after 3 hours treatment, an optimum value for a side wall of a saucepan suitable for ensuring proper resistance to the use of metal utensils.

It follows that the resistance value of first non-stick coating 30 will maintain resistance of a value of 5 or more for a time at least 4 times longer than second non-stick coating 40.

According to a particularly preferred aspect of the invention first non-stick coating 30 and second non-stick coating 40 are of different colour. This enables the final user to see that two different non-stick coatings are present in a cooking vessel by visual inspection.

It is obviously advantageous to provide two contrasting colours such that they can easily be differentiated, such as for example a black colour and a lighter colour. In order to produce container 1 according to the invention it is possible to provide a dark colour and a lighter colour.

According to a preferred embodiment of container 1, first non-stick coating 30 is of a less conventional colour for the type of product, such as for example terracotta, or red-orange, or brown or bronze colours, while second non-stick coating 40 is of a conventional black, blue, grey or aluminium colour.

The functioning of the invention will be obvious to those skilled in the art from what has been described and in particular is as follows.

At the time of purchase the end user will only have to look at the inside surface of bottom wall 3 to check whether or not the first high quality non-stick coating 30 is present.

Seeing that bottom wall 3 has a different colour from side wall 4 in the same saucepan, the user will know that the container examined comprises two different non-stick coatings 30, 40 and that the first 30, or that applied to at least part of the inside surface of bottom wall 3, is of better quality than non-stick coating 40 applied to the inside surface of side wall 4, and also of high quality.

Once the purchase has been made, container 1 will be used in the same way as any other conventional cooking vessel.

The invention claimed is:

1. Container for cooking food, comprising
a body (2) comprising a bottom wall (3) and at least one side wall (4) extending from said bottom wall (3);
at least one first non-stick coating (30) on at least part of the inside surface area of said bottom wall (3), and at least one second non-stick coating (40) on at least part of the inside surface area of said side wall (4);
characterised in that said first non-stick coating (30) differs from said second non-stick coating (40) and has greater resistance to scratching than the second non-stick coating (40);
wherein the first non-stick coating (30) and the second non-stick coating (40) are of different colour;
wherein the first non-stick coating (30) has a resistance value of 5 or more according to a mechanical tiger paw (MTP) test, for a time of over 12 hours in the test.

2. Container according to claim 1, characterised in that the first non-stick coating (30) has a resistance value of 5 according to the MTP test, for time of over 24 hours in said test.

3. Container according to claim 1, characterised in that the first non-stick coating (30) has a resistance value of 5 according to the MTP test, for a time of over 36 hours in said test.

4. Container according to claim 1, characterised in that the second non-stick coating (40) has a resistance value of 5 or more according to the MTP test, for a time of 3 hours in said test.

5. Container according to claim 1, characterised in that the first non-stick coating (30) has a resistance value of 5 or more for a time at least 4 times longer than second non-stick coating (40).

6. Container according to claim 1, characterised in that only one first non-stick coating (30) is applied to all the inside surface area of the bottom wall (3).

7. Container according to claim 1, characterised in that only one second non-stick coating (40) is applied to all the inside surface area of the side wall (4).

8. Container for cooking food, comprising
a body (2) comprising a bottom wall (3) and at least one side wall (4) extending from said bottom wall (3);
at least one first non-stick coating (30) on at least part of the inside surface area of said bottom wall (3), and at least one second non-stick coating (40) on at least part of the inside surface area of said side wall (4);
characterised in that said first non-stick coating (30) differs from said second non-stick coating (40) and has greater resistance to scratching than the second non-stick coating (40);

wherein the first non-stick coating (30) and the second non-stick coating (40) are of different colour;

wherein the second non-stick coating (40) has a resistance value of 5 or more according to a mechanical tiger paw (MTP) test, for a time of 3 hours in said test.

9. Container according to claim 8, wherein the first non-stick coating (30) has a resistance value of 5 or more according to the MTP test, for a time of over 12 hours in the test.

10. Container according to claim 8, characterised in that only one first non-stick coating (30) is applied to all the inside surface area of the bottom wall (3).

11. Container according to claim 8, characterised in that only one second non-stick coating (40) is applied to all the inside surface area of the side wall (4).

12. Container for cooking food, comprising
a body (2) comprising a bottom wall (3) and at least one side wall (4) extending from said bottom wall (3);
at least one first non-stick coating (30) on at least part of the inside surface area of said bottom wall (3), and at least one second non-stick coating (40) on at least part of the inside surface area of said side wall (4);
characterised in that said first non-stick coating (30) differs from said second non-stick coating (40) and has greater resistance to scratching than the second non-stick coating (40);
wherein the first non-stick coating (30) and the second non-stick coating (40) are of different colour;
wherein the first non-stick coating (30) has a resistance value of 5 or more for a time at least 4 times longer than second non-stick coating (40).

13. Container according to claim 12, wherein the second non-stick coating (40) has a resistance value of 5 or more according to a mechanical tiger paw (MTP) test, for a time of 3 hours in said test.

14. Container according to claim 13, wherein the first non-stick coating (30) has a resistance value of 5 or more according to the MTP test, for a time of over 12 hours in the test.

\* \* \* \* \*